T. BROWN.
MANURE SPREADER.
APPLICATION FILED JUNE 1, 1909.

990,472.

Patented Apr. 25, 1911.

2 SHEETS—SHEET 1.

Witnesses
R. D. Tolman
Penelope Cumberbach.

Inventor
Theophilus Brown
By Rufus B Fowler
Attorney

T. BROWN.
MANURE SPREADER.
APPLICATION FILED JUNE 1, 1909.

990,472.

Patented Apr. 25, 1911.
2 SHEETS—SHEET 2.

Witnesses
Ray D. Tolman
Penelope Comberbach

Inventor
Theophilus Brown
By Rufus B. Fowler
Attorney.

UNITED STATES PATENT OFFICE.

THEOPHILUS BROWN, OF WORCESTER, MASSACHUSETTS, ASSIGNOR TO RICHARDSON MANUFACTURING COMPANY, OF WORCESTER, MASSACHUSETTS, A CORPORATION OF MASSACHUSETTS.

MANURE-SPREADER.

990,472.

Specification of Letters Patent.   Patented Apr. 25, 1911.

Application filed June 1, 1909.   Serial No. 499,469.

*To all whom it may concern:*

Be it known that I, THEOPHILUS BROWN, a citizen of the United States, residing at Worcester, in the county of Worcester and Commonwealth of Massachusetts, have invented a new and useful Improvement in Manure-Spreaders, of which the following is a specification, accompanied by drawings forming a part of the same, in which—

Figure 1:
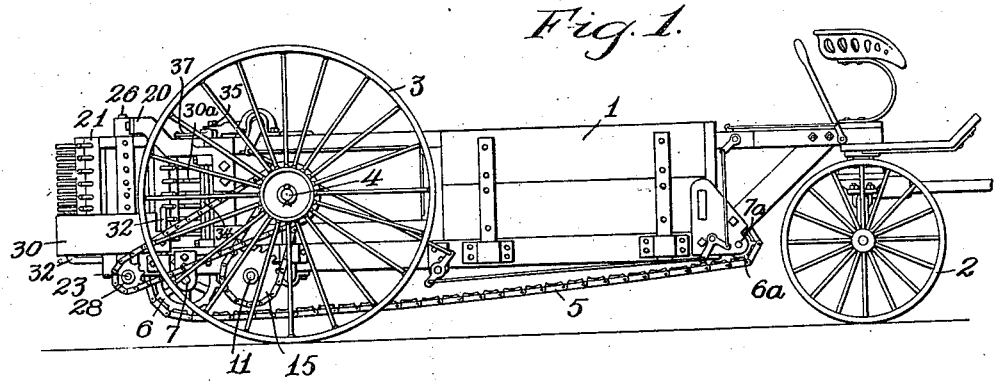
Figure 2:
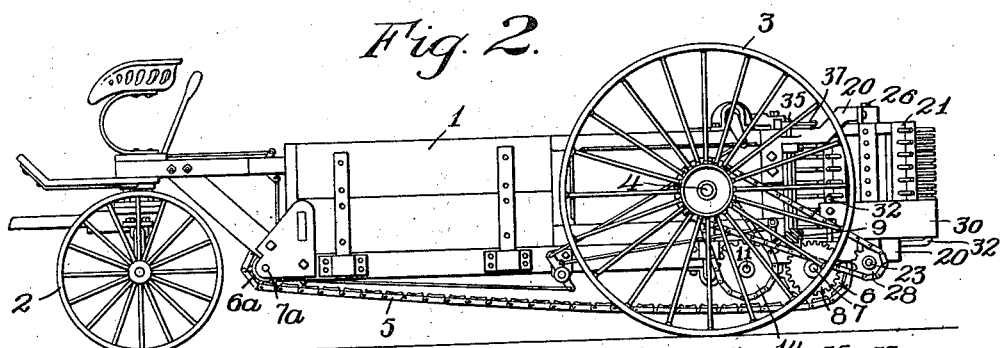
Figure 3:
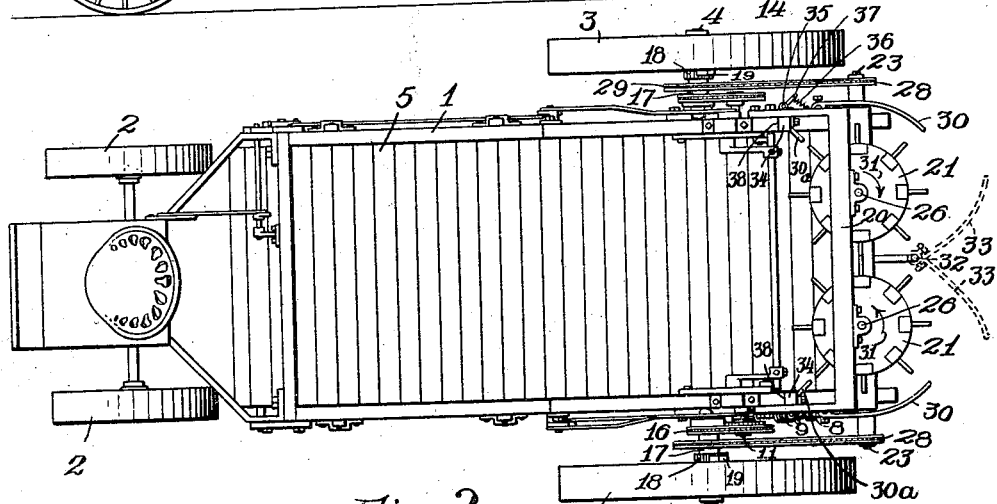
Figure 4:
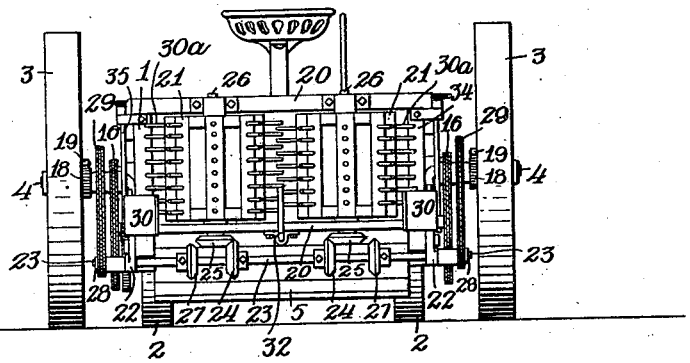
Figure 5:
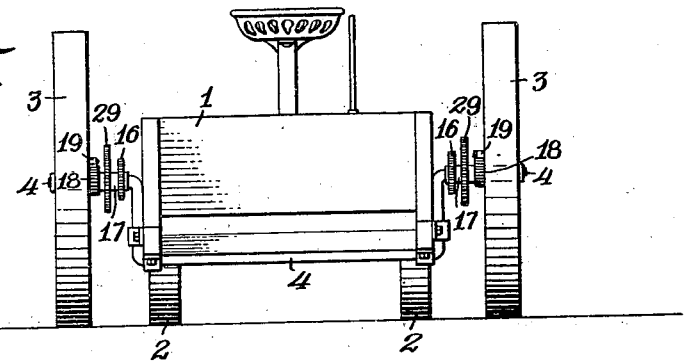
Figure 6:
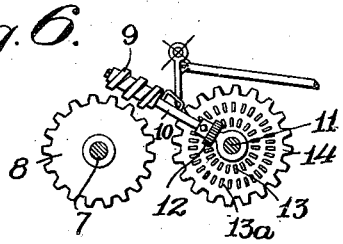
Figure 7:
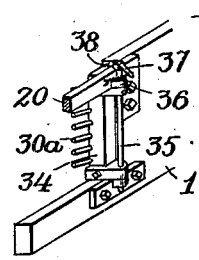

Figure 1 is a side view of a manure spreader embodying my invention. Fig. 2 is the same view showing the opposite side. Fig. 3 is a plan view. Fig. 4 is a rear view. Fig. 5 is a rear view of the body and supporting wheels, with the beaters, the movable bottom and their actuating mechanism removed. Fig. 6 is a detached view of a portion of the bottom actuating mechanism, and Fig. 7 is a detached perspective view of one of the rows of yielding pulverizing teeth.

Similar reference characters refer to similar parts in the different figures.

My invention relates to that class of manure spreaders which are provided with a rotating beater at the rear end of the body of the spreader for distributing the manure, and it consists in the construction and arrangement of parts as hereinafter described and pointed out in the annexed claims.

Referring to the accompanying drawings, 1 is the body of a manure spreader supported on forward wheels 2 and rear wheels 3. The rear wheels 3 are carried upon a cranked axle 4, upon which the body 1 is supported in a plane below the center of the rear wheels 3. The body 1 is provided with a movable bottom 5 carried on sprocket wheels 6, 6ª, which are attached to transverse shafts 7, 7ª. The movement of the bottom 5 is accomplished by the rotation of one of the sprocket wheel shafts, in the present instance, the shaft 7, which carries a worm gear 8 on one end engaged by a worm 9 on a short shaft 10 which is capable of swinging from one end about the axis of a shaft 11, which extends beneath the body 1 and transversely thereto.

The short shaft 10 carries an adjustable pinion 12, which is driven by one of the crown gears 13, 13ª, on the side of a sprocket wheel 14 on one end of the shaft 11. The opposite end of the shaft 11 is also provided with a sprocket wheel 15. The sprocket wheels 14 and 15 are driven through chain connections by sprocket wheels 16, 16, attached to sleeves 17, 17, which rotate about the axle 4 between the body 1 and the wheels 3, 3. The sleeves 17, 17, are driven in one direction from the wheels 3, 3, by means of ratchet wheels 18 attached to the sleeves and pawls 19 carried by the wheels 3, 3. The worm and worm wheel mechanism driven by the crown gears 13 or 13ª, according to the desired speed of the movable bottom, is substantially like the corresponding bottom driving mechanism shown in United States Letters Patent No. 268,410, dated December 5, 1882, and forms no part of my present invention.

Projecting rearwardly from the body portion 1 is a frame 20, in which are journaled the shafts of vertical beaters 21 arranged to spread the manure contained in the body, and which is carried into contact with the beaters 21 by the movable bottom 5. Journaled in bearings 22 supported beneath the frame 20 is a horizontal shaft 23 provided with bevel gears 24, arranged to engage bevel gears 25 upon the lower ends of the beater shafts 26. A pair of bevel gears 27, with their faces in opposite directions, are carried upon the shaft 23, capable of being substituted for the bevel gears 24 when it is desired to rotate the beaters 21 in the opposite direction. Mounted upon each end of the horizontal shaft 23 is a sprocket wheel 28 driven from sprocket wheels 29 carried by the sleeve 17. A vertical row 30ª of horizontal teeth is arranged in each rear inner corner of the frame 20, to coöperate with the teeth of the revolving beater in pulverizing the manure, as shown in Fig. 3.

In order to control the distribution of manure as it is distributed by the beaters, I provide curved shields 30 attached at one end to the frame 1 and curving inward as shown in Fig. 3. The shields are of a width sufficient to intercept the lateral flight of a due proportion of manure and deposit it behind the beater. The arrangement of the shields 30, shown in Fig. 3, is designed for the inward rotation of the beater in the direction of the arrows 31 in that figure. When the beaters are to rotate in the opposite direction, accomplished by driving the beaters by the beveled gears 27 instead of the gears 24, the position of the shields 30 is changed and they are attached to the vertical post 32 at the rear of and between the beaters, as shown by dotted lines 33 in Fig. 3. When the shields are in the position shown at the sides, a portion of the manure, which would otherwise be directed laterally outward, will be turned inwardly and caused to fall behind the center of the body. When the shields are supported on the post 32, the manure thrown against the shields is deflected outwardly. The shields may be used to deflect the manure in one direction only, if desired. The amount of manure deflected will depend upon the width of the shields and this may be varied as desired.

I have shown two vertical beaters, but the number may be varied if found desirable. By the use of beaters placed at an angle other than horizontal, as is usual, I distribute the manure over a space wider than the width of the body and thereby increase the efficiency of the spreader.

Each vertical row 30ª of teeth is supported upon posts 34 which are attached to rods 35 pivoted in the framework of the spreader. The teeth are maintained in position to point toward the center of the beater 21 by means of a spring 36, attached at one end to a lever 37 carried by the upper end of the rod 35, with its opposite end attached to the framework. The post 34 is, therefore, yieldingly held against a stop 38, and is capable of swinging when too great pressure is applied to the row 30ª of teeth. As the manure is caught by the teeth of the beater, it is forced between the row 30ª of teeth and shredded, or pulverized.

I claim,

1. A manure spreader, comprising a body, a movable bottom for said body, and a rotatable beater above the plane of said movable bottom with the axis of rotation of said beater at an angle to the horizontal.

2. A manure spreader, comprising a body, a movable bottom, and a vertical rotatable beater journaled at the rear end of said body above said movable bottom.

3. A manure spreader having a body, supporting wheels for the rear of said body, a movable bottom, a rotatable beater vertical above the plane of said movable bottom, and intermediate connecting mechanism between said beater and said supporting wheels.

4. A manure spreader having a body with a movable bottom arranged to receive the manure, a vertical beater journaled at the rear of said body and above the plane of said movable bottom, and arranged to cause the distribution of manure directly from said movable bottom.

5. A manure spreader, comprising a body, a movable bottom, and multiplicity of rotatable beaters above the plane of said movable bottom, with the axis of each beater in a different plane longitudinally to said movable bottom and at an angle to the horizontal plane of said movable bottom.

6. A manure spreader having a body, supporting wheels for the rear of said body, with the bottom of said body supported at a plane below the center of said wheels, a frame attached to the rear of said body, a vertical beater journaled in said frame above the plane of said bottom, a horizontal shaft beneath said beater for imparting rotation thereto, and means for connecting each end of said horizontal shaft with one of said supporting wheels.

7. A manure spreader, having a body, a rotatable vertical beater supported by said body, a row of teeth supported by said body and arranged to coöperate with the teeth of said beater, and means for rotating said beater.

8. A manure spreader having a body, a movable bottom for said body, a rotatable beater above the plane of said movable bottom, with the axis of rotation of said beater at an angle to the horizontal, and curved shield plates on opposite sides of said body above the plane of said movable bottom and extending rearwardly from the plane of said beater.

9. A manure spreader, having a body, a pair of vertical rotatable beaters at the rear end of said body, and a shield plate support at the rear of and in a plane between said beaters.

Dated this 29th day of May 1909.

THEOPHILUS BROWN.

Witnesses:
PENELOPE COMBERBACH,
NELLIE WHALEN.

---

Copies of this patent may be obtained for five cents each, by addressing the "Commissioner of Patents, Washington, D. C."